United States Patent
Azevedo et al.

(10) Patent No.: US 12,227,937 B2
(45) Date of Patent: Feb. 18, 2025

(54) THERMAL INSULATION MATERIAL COMPRISING PARTIALLY OXIDIZED GRAPHITE OXIDE PARTICLES

(71) Applicant: SAINT-GOBAIN ISOVER, Courbevoie (FR)

(72) Inventors: Joël Azevedo, Gif sur Yvette (FR); Veneta Grigorova-Moutiers, Guyancourt (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 1143 days.

(21) Appl. No.: 17/052,535

(22) PCT Filed: Apr. 30, 2019

(86) PCT No.: PCT/FR2019/051006
§ 371 (c)(1),
(2) Date: Nov. 3, 2020

(87) PCT Pub. No.: WO2019/211559
PCT Pub. Date: Nov. 7, 2019

(65) Prior Publication Data
US 2021/0230864 A1  Jul. 29, 2021

(30) Foreign Application Priority Data
May 4, 2018  (FR) ..................... 1870534

(51) Int. Cl.
*C08J 9/16* (2006.01)
*C08J 9/00* (2006.01)
*E04B 1/76* (2006.01)
*E04B 1/78* (2006.01)
*E04B 1/74* (2006.01)

(52) U.S. Cl.
CPC .......... *E04B 1/7658* (2013.01); *C08J 9/0095* (2013.01); *C08J 9/16* (2013.01); *E04B 1/78* (2013.01); *C08J 2325/06* (2013.01); *E04B 2001/742* (2013.01)

(58) Field of Classification Search
CPC .... E04B 1/7658; E04B 1/78; E04B 2001/742; B32B 5/18; C08J 9/0095; C08J 9/16; C08J 2325/06; C08J 9/0066; C01B 32/23; C03C 25/44; C08K 3/04
USPC ................................... 442/368, 417
See application file for complete search history.

(56) References Cited

U.S. PATENT DOCUMENTS

| | | | |
|---|---|---|---|
| 2006/0293443 A1* | 12/2006 | Reinheimer ............. | C08K 3/04 524/589 |
| 2013/0330477 A1* | 12/2013 | Blair ..................... | C01B 32/184 427/372.2 |
| 2018/0030231 A1 | 2/2018 | Kondratowicz et al. | |

FOREIGN PATENT DOCUMENTS

| | | |
|---|---|---|
| CN | 106009493 A | 10/2016 |
| CN | 107827479 A | 3/2018 |
| KR | 1020170106390 A | 9/2017 |

OTHER PUBLICATIONS

Wicklein, Bernd, et al., Thermally insulating and fire-retardant lightweight anisotropic foams based on nanocellulose and graphene oxide, Nature Nanotechnology, 10, (2015), p. 277-283. (Year: 2014).*

Eda, Goki, et al., "Partially oxidized graphene as a precursor to graphene," J. Mater. Chem., 21 (2011) p. 11217-11223. (Year: 2011).*

Bernd Wicklein et al, "Thermally insulating and fire-retardant lightweight anisotropic foams based on nanocellulose and graphene oxide", Nature Nanotechnology, vol. 10, XP002788126, Nov. 2, 2014, 7 pages.

International Search Report issued Aug. 30, 2019 in PCT/FR2019/051006 (with English translation), 6 pages.

Saoirse Dervin et al, "Graphene oxide reinforced high surface area silica aerogels", Journal of Non-Crystalline Solids, vol. 465, XP002788127, Mar 31, 2017, 8 pages (plus cover page).

* cited by examiner

*Primary Examiner* — Matthew D Matzek
(74) *Attorney, Agent, or Firm* — Element IP, PLC

(57) ABSTRACT

The present invention relates to a thermal insulation material comprising graphite oxide particles, and also to the use of partially oxidized graphite oxide particles as an opacifying agent in a thermal insulation material.

17 Claims, No Drawings

THERMAL INSULATION MATERIAL COMPRISING PARTIALLY OXIDIZED GRAPHITE OXIDE PARTICLES

The present invention relates to the field of thermal insulation materials. It more particularly concerns the use of graphite oxide particles as an opacifying agent in such insulation materials.

The thermal insulation of buildings makes it possible to reduce heat losses and thus contributes to improving comfort, to reducing the risks of damage to the buildings linked to premature aging, and to reducing energy consumption both for heating and for any possible cooling. Exchanges of heat with the outside through the shell of the building generally occur via conduction and/or via radiation. Traditional thermal insulation materials tend to reduce these exchanges: the air immobilized for example within foams or between fibers reduces the thermal conduction of the walls and the walls of the cells of the foams or the fibers help to shield from the radiation. It is also known to add opacifying agents to insulation materials for housing in order to reduce exchanges via radiation. An opacifying agent is a component, generally in particulate form, exhibiting a high capacity for absorption and/or diffusion of at least a portion of the infrared radiation. The use of graphite particles as an opacifying agent in polymer foams, such as expanded polystyrene (EPS), has for example been proposed (EP 0 981 574, EP 1 758 951, EP 1 819 758, EP 2 683 763, EP 1 945 700, EP 2 010 601). Graphite particles have the advantage of exhibiting high extinction coefficients in the infrared while being inexpensive. However, they may exhibit certain drawbacks, in particular relating to their use. Since graphite is extremely hydrophobic, its use in existing processes is not easy. Indeed, it may be difficult to obtain a homogeneous dispersion of the graphite particles in the insulation materials. Since poor dispersion leads to a loss of opacification efficiency, the dispersion quality is a crucial property for opacifying agents. In addition, there remains a demand to improve the performance of thermal insulation materials.

The objective of the present invention is to obviate the drawbacks mentioned above, by proposing an opacifying agent exhibiting improved opacification properties, having a low cost price and the quality of dispersion of which in different media may be ensured.

Thus, one aspect of the present invention relates to a thermal insulation material comprising partially oxidized graphite oxide particles. Within the meaning of the present invention, "partially oxidized graphite oxide particles" is understood to mean that the graphite particles have undergone mild oxidation. This is because it has been observed that the partial oxidation of graphite particles, in contrast to extensive oxidation (to which the term graphite oxide generally refers), made it possible to significantly improve their opacification efficiency through a better dispersion of the particles and/or an improvement in their opacification properties. Without wishing to be bound by any one theory, it is assumed that the partially oxidized graphite oxide particles exhibit a core-shell structure with a conductive core made of graphite absorbing in the infrared and an oxidized shell reflecting in the infrared. Moreover, through the choice of the degree of partial oxidation of the graphite oxide particles, it is possible to adjust the hydrophobic (contribution of the carbon-based planes)/hydrophilic (contribution of the oxygen-based groups) balance in order to optimize their dispersion in different media depending on their more or less hydrophilic/hydrophobic nature.

The graphite oxide particles may be obtained by oxidation of graphite using methods well known to those skilled in the art, as described for example by Brodie et al., *Philos. Trans. R. Soc. London,* 1859, 149, 249-259, Staudenmaier, *Ber. Dtsch. Chem. Ges.,* 1898, 31 (2), 1481-1487, Hummers et al., *J. Am. Chem. Soc.,* 1958, 80 (6), 1339, Moritomo et al., *Sci. Rep.,* 2016, 6, 21715, Lee et al., *J. Phys. Chem. C,* 2011, 115 (6), pp. 2705-2708, Zhao et al., *ACS Nano,* 2010, 4 (9), pp. 5245-5252 or Muzyka et al., *New Carbon Materials,* 2017, 32(1), 15-20. The use of rather mild or, in contrast, extensive methods for oxidation of the graphite makes it possible to adjust the degree of oxidation desired for the graphite oxide particles. In particular, the partially oxidized graphite oxide particles may be obtained by chemical oxidation methods using weaker oxidizing agents and/or reduced reaction times, compared to the conventional methods for extensive oxidation. Other mild oxidation methods use physical treatments, such as treatments with ultrasound.

Due to their partial oxidation, the graphite oxide particles used in the present invention exhibit significantly higher extinction coefficients than graphite particles or even than conventional oxidized graphite particles which have undergone extensive oxidation. In other words, these high extinction coefficients are characteristic of a partial oxidation of the graphite oxide particles. In a first embodiment, the insulation material according to the invention may thus be characterized in that the partially oxidized graphite oxide particles exhibit an absolute mass extinction coefficient, at ambient temperature over the range from 2 to 18 μm, of greater than 5000 $m^2/kg$, preferably of greater than 7000 $m^2/kg$, more preferably of greater than 10 000 $m^2/kg$, or even of greater than 13 000 $m^2/kg$, and typically of less than 30 000 $m^2/kg$, indeed even 25 000 $m^2/kg$.

The degree of oxidation of the graphite oxide particles may be evaluated by X-ray photoelectronic spectroscopy (XPS). More precisely, a deconvolution is performed on the basis of an XPS spectrum of the carbon (C1s) by taking into consideration the contribution of four peaks, the peak C1 at 284 eV assigned to the carbon bonds: C=C and C—C; the peak C2 at 286.5 eV assigned to the hydroxyl and epoxy bonds: C—OH and C—O—C; the peak C3 at 288.3 eV assigned to the ketone bonds: C=O; and the peak C4 at 290.5 eV assigned to the carboxylic acid bonds: O=C—OH. The deconvolution is performed by taking into consideration Gaussian functions for the peaks C2, C3 and C4 and an asymmetric peak with a full width at half maximum of 0.8 eV for the graphitic component C1. The ratio of the areas Ai (A2+A3+A4)/(A1+A2+A3+A4), corresponding respectively to the peaks Ci (i=1 to 4), makes it possible to define an oxidation ratio. The higher this oxidation ratio, the more the graphite oxide particles are oxidized and vice versa. In a second embodiment, the insulation material according to the invention may be characterized in that the partially oxidized graphite oxide particles preferably exhibit an oxidation ratio of greater than 6%, more preferably of greater than 7%, 8% or 9%, in particular of 9.5%, indeed even 10%, 10.5% or even 11%, and up to 50%, indeed even 40%, 30% or even 20%. Moreover, the ratio A2/(A2+A3+A4) is preferably at least 15.0%, more preferably of 18.0%, indeed even 19.0% or even 20.0% to 60%, indeed even 50%, 40% or even 30%. It goes without saying that the insulation material according to the invention may also be characterized in that the partially oxidized graphite oxide particles exhibit both an extinction coefficient of greater than 5000 $m^2/kg$, preferably of greater than 7000 $m^2/kg$, more preferably of greater than 10 000 $m^2/kg$, or even of greater than 13 000 $m^2/kg$, and typically of less than 30 000 $m^2/kg$, indeed even 25 000 m²/kg, and an oxidation ratio, indeed even also a ratio A2/(A2+A3+A4), as defined hereinabove.

The thermal insulation material may be any type of material well known to those skilled in the art. It may in particular be in the form of an insulating mat, an insulation panel or in loose form.

Among the most common thermal insulation materials, mention may be made of fibrous insulation materials based on natural fibers of animal or vegetable origin or synthetic/mineral fibers, such as glass wool or rock wool. The fibrous insulation material is preferably based on glass wool or on rock wool. A conventional glass wool composition comprises the following constituents, expressed as percentages by weight:

$SiO_2$ 50% to 75%
$Al_2O_3$ 0% to 8%
CaO+MgO 5% to 20%
$Fe_2O_3$ 0% to 3%
$Na_2O+K_2O$ 12% to 20%
$B_2O_3$ 2% to 10%

The glass wool may also be rich in alumina, in which case it generally comprises the following constituents, expressed as percentages by weight:

$SiO_2$ 35% to 50%
$Al_2O_3$ 10% to 30%
CaO+MgO 12% to 35%
$Fe_2O_3$ 1% to 15%
$Na_2O+K_2O$ 0% to 20%

A conventional rock wool composition generally comprises the following constituents, expressed as percentages by weight:

$SiO_2$ 30% to 50%
$Al_2O_3$ 10% to 20%
CaO+MgO 20% to 40%
$Fe_2O_3$ 5% to 15%

The fibers may be bonded by a binder. The binder may be a thermoplastic or thermosetting binder. Examples of thermosetting binders comprise phenol/formaldehyde binders, polymer binders based on acrylates and/or on polyols, and also biobased binders as described in particular in WO 2009/080938, WO 2009/080938 or WO 2007/014236. In another embodiment, the material according to the invention may comprise fibers that are not bonded by a binder.

The graphite oxide particles may be dispersed at the surface of the fibers in the form of a powder or via a sizing composition, before the optional application of the binder using a binding compound. Alternatively, the graphite oxide particles may be dispersed in the binder when the latter is present. In this case, the graphite oxide particles are introduced into the binding compound before it is applied to the fibers.

The fibrous insulation material may be in the form of a mat of fibers, a fiber panel or blowing wool. It typically comprises from 1%, indeed even 2% or 3%, and up to 100%, indeed even 60%, or even 20% by weight of graphite oxide particles, with respect to the weight of fibers. Insulation materials comprising significant quantities of opacifier, in particular of greater than 20% by weight, are particularly suited to high-temperature applications.

Mention may also be made of cellular insulation materials of the expanded polymer foam type, such as expanded (EPS) or extruded (XPS) polystyrene, phenolic foams, polyurethane foams or biobased foams. Examples of biobased foams comprise foams obtained from reducing sugars and amine compounds, described for example in WO 2016/139401, foams obtained from sugars and strong acids, described for example in WO 2016/174328, or foams obtained from polyols and polyacids, described for example in WO 2016/207517.

The polymer matrix forming the polystyrene foams typically comprise a homopolystyrene or a styrene copolymer possibly containing up to 20%, with respect to the weight of the polymers, of ethylenically unsaturated comonomers, in particular of alkylstyrene, of divinylbenzene, of acrylonitrile or of α-methylstyrene. Mixtures of polystyrene and of other polymers, in particular with rubber and polyphenylene ether, are also possible. The polymer matrix may also contain usual and known additives, for example flame retardants, nucleating agents, UV stabilizers, chain transfer agents, blowing agents, plasticizers, pigments and antioxidants. Some application modes, in particular for polyurethane foams, enable the mixing and the application of precursor solutions in situ, thus forming the foam directly on the surface to be insulated. However, cellular insulation materials are generally in the form of panels or blocks. They may be combined with other materials in the form of composite panels comprising for example a layer of polymer foam, such as expanded polystyrene, and a layer of a more rigid material, such as a wood panel or a plasterboard.

The graphite oxide particles are preferably dispersed in the polymer matrix of the foam, either by introduction while mixing the precursor solutions or by prior introduction into one of the precursor solutions. Alternatively, the graphite oxide particles may be mixed with the molten polymer, preferably in an extruder. In the case of polystyrene foam in particular, a blowing agent may be present in the molten polymer at the time of the addition of the graphite oxide particles or added at the same time with the latter.

The expanded polymer foams, in particular of polystyrene, typically have a density of from 7 to 20 kg/m³, preferably of from 9 to 15 kg/m³.

The cellular insulation material typically comprises from 1%, indeed even 2% or 3%, and up to 100%, indeed even 60%, or even 20% by weight of graphite oxide particles, with respect to the weight of foam.

The thermal insulation material according to the invention may also be an aerogel-based or amorphous (in particular fumed or precipitated) silica-based insulation material, or a vacuum insulation material. Aerogels, typically in the form of translucent granules or of powder exhibiting grain or granule sizes which are conventionally of the order of a millimeter, are generally used with protections or a reinforcing agent, for example within mats formed from entangled mechanically resistant fibres. Examples of such insulation materials are described in particular in WO 01/28675, US 2007/154698 or EP 0 171 722.

The present invention also relates to a method for manufacturing a thermal insulation material exhibiting improved thermal conductivity properties, in particular as described hereinabove, comprising the introduction of graphite oxide particles into the thermal insulation material. The introduction of the graphite oxide particles may be performed by application of a solution comprising the graphite oxide particles (for example a sizing composition, a binding compound or a surface coating composition) onto the insulation material. The particles may also be introduced into the insulation material by incorporation into the matrix of the insulation material during its manufacture.

The present invention also relates to the use of graphite oxide particles as described hereinabove as an opacifying agent in a thermal insulation material, and also to a method for reducing the thermal conductivity of a thermal insulation material comprising the introduction of graphite oxide particles into the thermal insulation material.

The thermal insulation material according to the invention may be used in the field of construction, in particular for the internal and/or external insulation of walls, floors or roofs of buildings. Other fields of application also comprise the insulation of means of (in particular rail or sea) transport, of high-temperature devices (ovens, inserts, etc.), of ventilation ducts, of piping, etc.

The examples which follow provide a nonlimiting illustration of the invention.

Four types of opacifiers (OP0, OP1, OP2 and OP3) were characterized. Opacifier OP0 consists of graphite particles which have not undergone any oxidation. Opacifiers OP1 and OP2 are graphite particles which have been partially oxidized to different degrees. Such partially oxidized graphite particles may be obtained by methods well known to those skilled in the art, in particular by ultrasound treatment. The OP2 particles were, for example, obtained in the following way: an aqueous dispersion of 1% by weight of graphite particles was subjected to an ultrasonic treatment for one hour. The dispersion produced is then frozen and freeze-dried to recover the partially oxidized graphite particles. The OP3 particles are particles which have undergone an extensive oxidation by a conventional chemical route. Ultrasound treatment methods exhibit the advantage of being inexpensive and easy to implement, in particular from the point of view of safety and environmental considerations, compared to the chemical oxidation methods.

An XPS analysis of the carbon C1s of the graphite oxide particles OP1 and OP2 was performed in order to evaluate the degree of oxidation thereof. A deconvolution of the XPS analysis spectrum was performed by taking into consideration the peaks C1, C2, C3 and C4 as mentioned hereinabove in order to determine the oxidation ratio (A2+A3+A4)/(A1+A2+A3+A4) and the ratio A2/(A2+A3+A4).

The absolute mass extinction coefficients ($EC_m$), expressed in $m^2/kg$, at ambient temperature over the range from 2 to 18 µm, of the opacifiers OP0, OP1, OP2 and OP3 were determined in two stages: (i) determination of the mass extinction coefficient of a polymer/opacifier system; and (ii) subtraction of the contribution of the polymer to this system.

(i) The determination of the mass extinction coefficients of the polymer/opacifier systems is based on the approach proposed by Zeng et al., *J. Mater. Res.*, vol. 11, No. 3, March 1996. It consists of a spectrometric characterization (in reflection and in transmission) of the analyzed system in the form of two films of the same material but of different thicknesses: an optically thick film (that is to say exhibiting a transmission of zero over the wavelength range considered) and an optically thin film (that is to say exhibiting a significant transmission over the wavelength range considered). The mass extinction coefficient of the system $EC_{Sys}$, expressed in $m^2/kg$, is determined according to the following relationship:

$$EC_{Sys} = \frac{1}{\rho \cdot e_{thin}} \ln\left[\frac{T_{thin}}{(1 - R_{thick})^2}\right]$$

in which ρ, expressed in $kg/m^3$, is the density of the polymer/opacifier system;

$e_{thin}$, expressed in m, is the thickness of the optically thin film;

$T_{thin}$ is the transmission of the optically thin film over the wavelength range considered; and $R_{thick}$ is the reflection of the optically thick film over the wavelength range considered.

The films are produced from a mixture of opacifier (OP0, OP1, OP2 and OP3) dispersed in a matrix of polystyrene with a consistent amount of opacifier particles—6%—and a consistent dispersion quality. The optically thin films have a thickness of from 10 to 25 µm, whereas the optically thick films have a thickness of greater than 350 µm.

(ii) The mass extinction coefficient of the polymer alone, $EC_{Pol}$, expressed in $m^2/kg$, is determined according to the double thickness method described above. The absolute mass extinction coefficient of the opacifying particles, $EC_m$, expressed in $m^2/kg$, is then determined by subtracting the contribution of the polymer matrix according to the following formula:

$$EC_m = \frac{(1 - OR)EC_{Pol} - EC_{Sys}}{OR}$$

in which OR is the percentage of opacifying particles in the polymer/opacifier system.

The extinction coefficient of a material over a given wavelength range represents the capacity of the material to absorb and/or diffuse the radiation over this wavelength range. Thus, the higher a material's extinction coefficient is in the infrared, the better are its opacifying properties.

The characteristics of the opacifiers OP0, OP1, OP2 and OP3 are summarized in the table hereinbelow.

TABLE 1

| Opacifier | Oxidation ratio $\frac{A2 + A3 + A4}{A1 + A2 + A3 + A4}$ (%) | $\frac{A2}{A2 + A3 + A4}$ (%) | $EC_m$ ($m^2/kg$) |
|---|---|---|---|
| OP0 | — | — | 3800 |
| OP1 | 11.8 | 18.5 | 13 600 |
| OP2 | 17.6 | 22.2 | 7700 |
| OP3 | 58.0 | 75.6 | 4400 |

The partially oxidized graphite particles OP1 and OP2 exhibit extinction coefficients which are significantly greater than the extinction coefficient of the nonoxidized graphite particles OP0. In contrast, the graphite particles OP3, which have undergone an extensive oxidation, exhibit an extinction coefficient comparable to the nonoxidized graphite particles OP0.

Expanded polystyrene foam panels having a density of 10 $kg/m^3$ and comprising 6% by weight of opacifier with respect to the polystyrene were prepared with each of the opacifiers OP0, OP1, OP2 and OP3. The panels according to the invention comprising the opacifiers OP1 and OP2 proved to exhibit significantly lower thermal conductivities (λ), being able to be reduced by up to 12%, with respect to the panels comprising the opacifier OP0 or OP3.

It will be noticed that the absolute mass extinction coefficient of the opacifier may be evaluated from the measurements of effective thermal conductivity performed on the insulation material, for example according to the standard DIN 52612, by using the additive approximation of the thermal conductivity of the lightweight porous media and the Rosseland approximation (valid for an optically thick sample, that is to say for example a thickness of greater than 10 mm for EPS foams).

According to the additive approximation, the effective thermal conductivity of a lightweight porous medium, such as expanded polystyrene foams, is written as follows:

$$\lambda_{\mathit{eff}} = \lambda_g + \lambda_s + \lambda_r$$

in which $\lambda_g$ is the gaseous conductivity; $\lambda_s$ is the solid conductivity; and $\lambda_r$ is the radiative conductivity.

For an EPS foam of 10 kg/m³ for example, the term ($\lambda_g+\lambda_s$) is 28.5 mW/(m·K), and this relationship may be written as $\lambda_{\mathit{eff}} = 28.5 + \lambda_r$.

The Rosseland approximation makes it possible in addition to link the radiative conductivity $\lambda_r$ to the extinction coefficient of the opacifying powder $EC_{op}$ by the following relationship:

$$\lambda_r = \frac{16}{3} \frac{n^2 \sigma_s T^3}{[(1-OR)EC_{Mat} + OR\,EC_m]\rho}$$

n is the refractive index of the gas (for air n=1);
$\sigma_s$ is the Stefan-Boltzmann constant (5.67 10⁻⁸ W/(m²·K⁴));
T, expressed in K, is the temperature of the medium;
OR is the opacification rate (weight percentage of opacifier in the insulation material);
$EC_{Mat}$, expressed in m²/kg, is the mass extinction coefficient of the non-opacified insulation material (typically 35 m²/kg for an EPS foam of 10 kg/m³);
$EC_m$, expressed in m²/kg, is the mass extinction coefficient of the opacifier;
and
ρ, expressed in kg/m³, is the density of the insulation material.

The combination of these two equations thus makes it possible to determine the extinction coefficient of an opacifier $EC_m$ from the effective thermal conductivity of the insulation material $\lambda_{\mathit{eff}}$.

Typically, for an EPS foam of 10 kg/m³ comprising 6% by weight of opacifier and at a temperature of 283 K, this relationship is written as:

$$EC_m = \frac{11440}{\lambda_{\mathit{eff}} - 28.5} - 548$$

This relationship may be easily adapted by those skilled in the art depending on the nature of the insulation material and on the amount of opacifier used.

The invention claimed is:

1. A thermal insulation material comprising partially oxidized graphite oxide particles, wherein said thermal insulation material is a fibrous insulation material further comprising mineral fibers in the form of a mat of fibers, a fiber panel, or blowing wool.

2. The thermal insulation material as claimed in claim 1, wherein the partially oxidized graphite oxide particles exhibit an extinction coefficient of greater than 5000 m²/kg.

3. The thermal insulation material as claimed in claim 1, wherein the graphite oxide particles exhibit an oxidation ratio (A2+A3+A4)/(A1+A2+A3+A4) of from 6% to 50%, wherein A1, A2, A3, and A4 respectively correspond to the areas of peaks C1, C2, C3, and C4 resulting from a deconvolution of an X-ray photoelectron spectroscopy (XPS) spectrum of the carbon C1s by taking into consideration the contribution of four peaks: CI at 284 eV, C2 at 286.5 eV, C3 at 288.3 eV and C4 at 290.5 eV; using Gaussian functions for the peaks C2, C3 and C4 and an asymmetric peak with a full width at half maximum of 0.8 eV for the peak C1.

4. The thermal insulation material as claimed in claim 3, wherein the graphite oxide particles exhibit a ratio A2/(A2+A3+A4) of at least 15.0%.

5. The thermal insulation material as claimed in claim 1, wherein said thermal insulation material is a fibrous insulation material further comprising mineral fibers in the form of a mat of fibers.

6. The thermal insulation material as claimed in claim 1, wherein said thermal insulation material is a fibrous insulation material further comprising mineral fibers in the form of a fiber panel.

7. The thermal insulation material as claimed in claim 1, wherein said thermal insulation material comprises from 1% to 100% by weight of graphite oxide particles, with respect to the weight of mineral fibers.

8. The thermal insulation material as claimed in claim 1, wherein said thermal insulation material is a fibrous insulation material further comprising mineral fibers in the form of blowing wool.

9. The thermal insulation material as claimed in claim 3, wherein the graphite oxide particles exhibit an oxidation ratio (A2+A3+A4)/(A1+A2+A3+A4) of from 9% to 30%.

10. The thermal insulation material as claimed in claim 3, wherein the graphite oxide particles exhibit a ratio A2/(A2+A3+A4) of at least 18.0%.

11. The thermal insulation material as claimed in claim 1, wherein the partially oxidized graphite oxide particles exhibit an extinction coefficient of greater than 5000 m²/kg and less than 30,000 m²/kg.

12. The thermal insulation material as claimed in claim 1, wherein the partially oxidized graphite oxide particles exhibit an extinction coefficient of greater than 7000 m²/kg and less than 25,000 m²/kg.

13. The thermal insulation material as claimed in claim 1, wherein the partially oxidized graphite oxide particles exhibit an extinction coefficient of greater than 13,000 m²/kg and less than 25,000 m²/kg.

14. The thermal insulation material as claimed in claim 3, wherein the graphite oxide particles exhibit a ratio A2/(A2+A3+A4) of 15.0%-60%.

15. The thermal insulation material as claimed in claim 1, wherein said thermal insulation material comprises from 3% to 100% by weight of graphite oxide particles, with respect to the weight of mineral fibers.

16. The thermal insulation material as claimed in claim 1, wherein said thermal insulation material comprises from 20% to 100% by weight of graphite oxide particles, with respect to the weight of mineral fibers.

17. The thermal insulation material as claimed in claim 1, wherein said thermal insulation material comprises from 60% to 100% by weight of graphite oxide particles, with respect to the weight of mineral fibers.

* * * * *